June 5, 1951          O. FISCHER          2,555,480
WHEELED AMUSEMENT AND EXERCISE VEHICLE
Filed Jan. 17, 1948
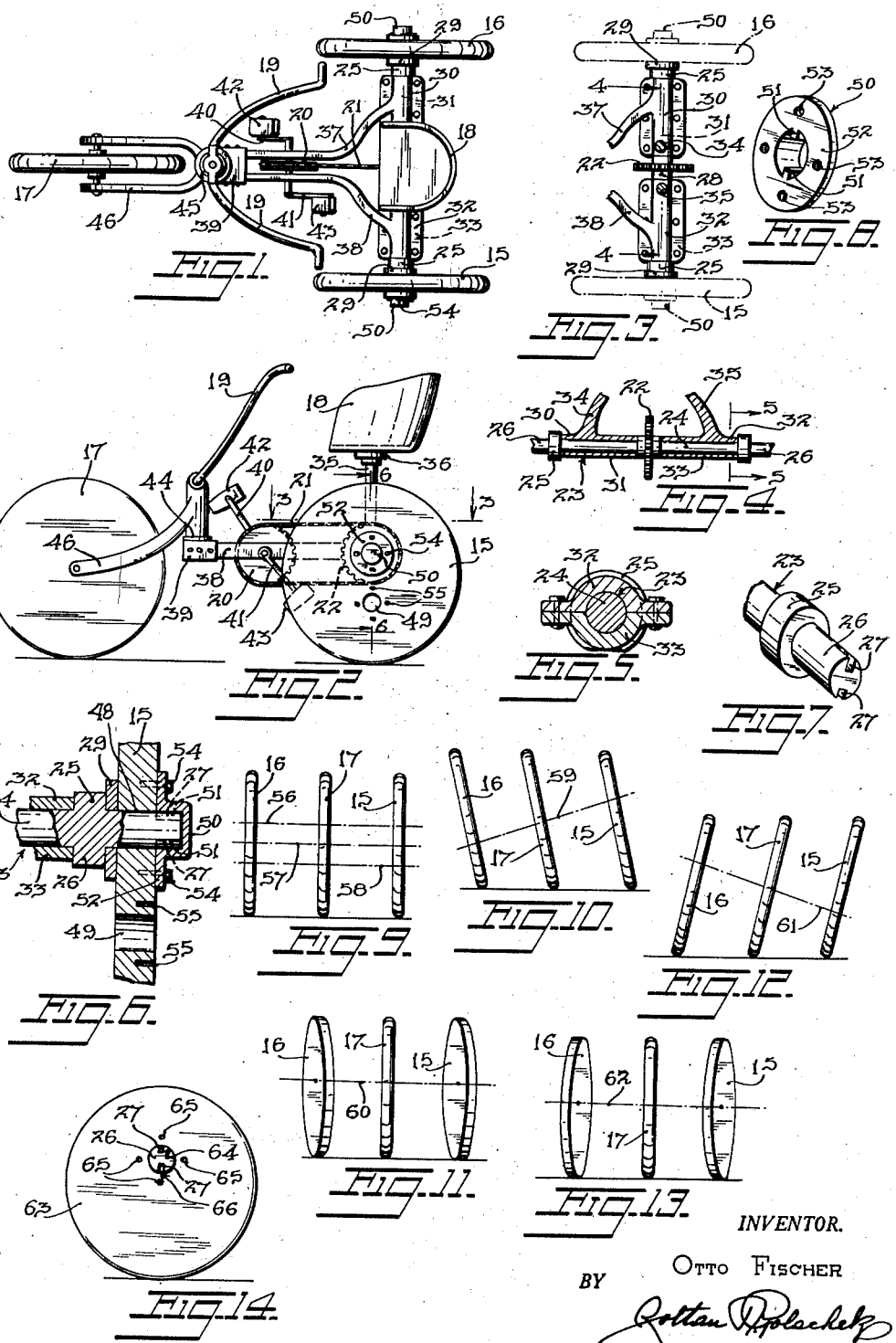
INVENTOR.
Otto Fischer
BY
*Attorney*

Patented June 5, 1951

2,555,480

UNITED STATES PATENT OFFICE 2,555,480

WHEELED AMUSEMENT AND EXERCISE VEHICLE

Otto Fischer, New York, N. Y.

Application January 17, 1948, Serial No. 2,945

1 Claim. (Cl. 280—229)

This invention relates to new and useful improvements in vehicles, and, more particularly, aims to provide a novel and valuable vehicle for affording an intriguingly entertaining mode of travel and one also such that healthful exercise may be had.

The vehicle of the invention is preferably steerable and self-propelled.

The underlying principle of the invention is that there is provided a new type of continuously varying movement for a rider-supporting part of the vehicle accompanied by an arrangement whereby the relatively movable parts of the vehicle may be readily rearranged so that, at will, said varying movement may be either a regularly recurring up and down one which may be called a bouncingly undulatory one, or one as just described plus a regularly repeated swaying of the vehicle from side to side. Also according to the invention, these bouncings and/or swayings may be varied by further rearrangements of the vehicle parts.

A feature of the invention is that, in combination with such provisions as those referred to in the paragraph immediately preceding, the vehicle may be self-propelled, at a desired speed, and at the same time readily steered, even with the parts arranged for the aforesaid swayings as well as bouncings; and, in indeed, the skill and attention required for graceful steering makes use of the vehicle especially interesting when said swayings are provided for.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a top plan view of a now favored form of three-wheeled vehicle according to the invention.

Fig. 2 is a side elevation thereof.

Fig. 3 is a structural detail, being a partial horizontal section taken on the line 3—3 of Fig. 2.

Fig. 4 is a further structural detail, being a partial vertical section taken on the line 4—4 of Fig. 3.

Fig. 5 is an enlarged transverse section, taken on the line 5—5 of Fig. 4.

Fig. 6 is a rear wheel mounting detail, being, also on an enlarged scale, a section taken on the line 6—6 of Fig. 2.

Fig. 7 is a fragmentary perspective view, showing one of the two like end portions of the axle for the rear wheels.

Fig. 8 is a perspective view, showing a hub cap.

Fig. 9 is a more or less diagrammatic view, showing the three wheels while looking toward the front of the vehicle, for illustrating different locations of the axis of said axle during travel of the vehicle; with the rear wheels mounted in one possible way on said axle.

Figs. 10, 11, 12 and 13, taken together, show conditions corresponding to the different conditions illustrated in Fig. 9; with the rear wheels mounted in another possible way on said axle.

Fig. 14 is, on an enlarged scale, a side elevation of one of the rear wheels, looking at the outside thereof, and showing a wheel modification.

It will be noted from the drawings that the vehicle selected for illustrating the invention is a tricycle, or three-wheeled one, and also of the velocipede type, that is, to be propelled by pedals. As will be understood, the vehicle may be merely for coasting downhill, or for propulsion in any desired way and by any appropriate means, as, for instance, a motor; and said vehicle may be a four-wheeled one, that is, including two front wheels instead of a single front wheel. As will also be understood, while the vehicle is shown as steerable by handlebars, the vehicle, instead, when made steerable, may be steered by a tiller-like handle or a steering wheel. As further will be understood, while the wheels, in order to simplify the drawings as much as possible, are shown as apparently solid discs without tires, they can be made to include wooden or wire spokes or the like, and provided with or without tires of rubber or other material, whether of the inflated tube type or otherwise.

Referring now to the drawings in detail, the vehicle is shown in Figs. 1–3 as having a pair of rear wheels 15 and 16, a front wheel 17, a seat 18, a steering means incorporating handlebars 19, and propelling means including a sprocket 20 connected by a sprocket chain 21 with a sprocket 22 fixed on the axle on which the wheels 15 and 16 are fixed.

Said axle, marked as whole 23 (Fig. 4–7) has a central main length 24, at opposite ends of which are collars 25. Beyond said collars are end extensions 26 of said main shaft length 24, and said extensions at their outer ends have oppositely located keyways 27. At about halfway along said main shaft length 24 the sprocket 22 is secured as at 28 by way of its hub to the axle 23. On the extensions 26 are loose washers 29.

Between the collars 25, on opposite sides of the sprocket 22, are two journalling means for the axle 23; one of said means comprising a pair of castings 30 and 31, and the other a pair of castings 32 and 33; each castings pair 30—31 and 32—33 being bolted together at matching flanges as shown.

Rising from each of the upper castings 30 and 32 there are legs 34 and 35, these legs upwardly converging to where they are joined by a crown piece 36 on which the seat 18 is secured.

Forwardly extending from each of the upper castings 30 and 32 there are legs 37 and 38, these legs coupled at their front ends by a U-shaped strap 39. The sprocket 20 is on a shaft journalled in the legs 37 and 38, such shaft having a pair of crank extensions 40 and 41 respectively carrying pivotally mounted pedals 42 and 43.

A post, only the flange 44 of which is shown, has a portion below said flange passed through a suitable aperture in the strap 39, whereby the post is fixed on the latter, and a portion upstanding from said flange entering and rotatively mounting a steering sleeve 45 forming part of a casting incorporating a fork 46 within which is journalled the front wheel 17. The handlebars 19 are fixedly carried by said sleeve.

Each wheel 15 and 16, as illustrated in Figs. 2 and 6 in the case of the wheel 15, is provided with two alternatively employable hub openings 48 and 49. Each of said openings is eccentrically located on its wheel, and as shown they are diametrically opposite each other, with each characterized by the same degree of eccentricity.

With a selected one of these openings of one rear wheel receiving one end 26 of the axle 23, and with the selected opening of the other rear wheel receiving the opposite end 26 of said axle, the wheels 15 and 16 are secured to the axle for rotation therewith by applying hub caps 50 which are secured to the axle by any suitable means such as a cotter-pin or the like. Such a hub cap, as will best be noted from Figs. 6 and 8, includes a central cup portion having keys 51 matching the keyways 27, and has a surrounding flange 52 apertured at 53 for the passage through such apertures of screws 54 for threaded engagement with matchingly located tapped recesses in the wheel for tightening up the cap on the wheel. These recesses, in the case of the opening 49 through the wheel 15, are designated 55 in Figs. 2 and 6.

The showing of Figs. 1 and 2 is illustrative of a mounting of both rear wheels such that with one end of the axle 23 keyed to the wheel 15 at the opening 48, this opening now vertically above the center of the wheel, the other end of the axle is keyed to the wheel 16 at its opening corresponding to the opening 48, this opening also now vertically above the center of the wheel. In other words, there is now what may be called an aligned eccentricity as between the two rear wheels.

Thus, during forward travel of the vehicle, the axle 23 will be bodily carried through a continually forwardly advancing path which is cylindrical about the horizontal, so that the bouncing effect obtained is one which causes the seat 18 to move along the path of a prolate cycloid. Referring in this connection to Fig. 9, the line 56 represents the location of the axis of the axle 23 with the parts as shown in Figs. 1 and 2, the line 57 represents the location of said axis when the wheels have turned through 90° and also when they have turned through 270°, and the line 58 represents the location of said axis when the wheels have turned through 180°.

The above possible arrangement of the parts, however, constitutes only a part of the invention; the same essentially having the characteristic that at will (a) the bouncing action as just explained may be had, or (b) a bouncing action accompanied by varying rockings of the axle 23 and varying side sways of the seat 18, of the three wheels, and of the connecting framework between the front and rear wheels, whether such framework be as herein shown by way of example, or made according to another selected design.

The gyrations of the axle 23 and the bouncings and swayings last referred to are had when, with one end of the axle 23 coupled say to the wheel 15 as above described, the other end of the axle is coupled to the wheel 16 by way of its opening corresponding to the opening 49; that is, the coupling of these wheels to the axle 23 is such that there is what may be called a 100% (or 180°) disaligned eccentricity as between the two wheels. As will be apparent, change of the rear wheels' relation, from that first described, to that just described, or vice versa, is readily accomplished after removal of either cap 50 and following reattachment of said cap.

Assuming that the aforesaid disaligned eccentricity as between the wheels 15 and 16 has been established, the showings of Figs. 10–13 graphically illustrate the swayings of the three wheels during forward travel of the vehicle, accompanied by bodily movement of the axle 23 through a continually forwardly advancing gyratory path such that the surface of revolution of said axle is defined by two horizontally aligned cones meeting apex to apex at about the center of length of the axle.

Fig. 10, showing the axle axis at 59, represents, let us say, a condition such, with the vehicle ready to start to move, that the wheel 15 has its center squarely below its journalling connection with the axle and the wheel 16 has its center squarely above its journalling connection with the axle. Now the axle axis is downwardly inclined toward the left, while lying in a vertical plane passing substantially centrally through both wheels; with an accompanying side tilt of all three wheels as shown in this view.

In Fig. 11, the line 60 represents the location of the axis of the axle 23 when the wheels have turned through 90°. Now said axis, lying in a horizontal plane, is rearwardly inclined toward the right, and the two rear wheels 15 and 16 are correspondingly sidewisely swung to hold them perpendicular to the axle axis; with the front wheel 17 similarly swung.

In Fig. 12, the line 61 represents the location of said axis when the wheels have turned through 180°. Now said axis is downwardly inclined toward the right, but again lying in the same vertical plane as mentioned above in connection with Fig. 10.

In Fig. 13, the line 62 represents the location of the axle axis when the wheels have turned through 270°. Now said axis, once again lying in a horizontal plane, is rearwardly inclined toward the left, and the two rear wheels 15 and 16 are correspondingly sidewisely swung to hold them perpendicular to the axle axis; with the front wheel similarly swung.

Thus, particularly on arrangement of the vehicle parts for operation as last described, a most entertaining and very exciting ride is offered a person on the seat 18, the thrill of which may be increased as he operates the pedals 41 and 42 faster and faster, and with steering possible despite the tiltings and swingings of the rear wheels 15 and 16 and of the front wheel 17.

In regard to the latter, the invention further contemplates a variation wherein the wheel 17 may also be eccentrically mounted, and if desired variable as to its degree of eccentricity. Such front wheel, moreover, may be arranged to have a definite eccentricity more or less than that provided for either or both of the rear wheels 15 and 16; and provisions may be made, as by providing more than two openings (as the openings 48 and 49) in one or both of the rear wheels, to allow the mounting of one of these wheels at its center with the other wheel mounted eccentrically, or to allow for mounting both rear wheels eccentrically and in any one of several possible different angularly related disalignments of eccentricity as between the two wheels. Again, as already stated, the vehicle may be a four-wheeled one, that is, with two front wheels; and in that case arrangements as above described for aligning or disaligning the eccentricity as between the two rear wheels may be provided for the two front wheels.

Referring finally to Fig. 14, a wheel 63 is shown illustrative of a provision which may be made in connection with both the rear wheels (and also if desired in connection with a single front wheel or two front wheels), whereby no wheel has more than one hub opening 64, attended by tapped recesses 65 corresponding to the recesses 55 of Fig. 6. The opening 64 would then be so placed that with the center thereof vertically above the bottom of the wheel where it contacts the road, the bottom of said opening would be at the center of the wheel, such center indicated by the arrowhead at an end of a lead 66. An end portion 26 of the axle is, see Fig. 14, in the opening 64, with the keyways 27 ready to receive the keys 51 of a hub cap 50 and then for securement of the wheel to the axle by attaching said hub cap by use of the elements 54 and 65.

As will be understood, with the wheel 63 arranged as shown, to have its larger portion squarely below the opening 64, the identically constructed wheel to be mounted on the same axle could be arranged, either to have its larger portion also squarely below its opening, for simple bouncing, or to have its smaller portion squarely below its opening, for compound bouncing, that is, bouncing accompanied by side swayings of the seat and side tiltings and swingings of the wheels.

Further points should be made, in connection with any two wheels provided for variable securement to a common axle, as the axle 23, for giving various relations of eccentricity as between said wheels.

Thus, for example, with said two wheels like the wheel 63, that is, with merely a single hub opening, as at 64, further variations may be had than those already mentioned, and this merely by providing, in lieu of the two keyways 27, three, four or more equally spaced keyways instead of merely two thereof and by providing a corresponding number and arrangement of keys in the hub caps.

Similarly, where said two wheels are like the wheels 15 and 16, that is, with two hub openings, as at 48 and 49, the same idea of multiple keys and keyways may be used, giving a very great number of possible relations of differential eccentricity as between said two wheels; while with said two wheels like the wheels 15 and 16, and with merely two keyways 27 as shown, by various rearrangements of said wheels four possible relations of differential eccentricity as between said two wheels may be set up.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

Means eccentrically mounting wheels on opposite ends of a rotatably mounted axle of a vehicle, each of the wheels having two opposed eccentrically formed hub openings selectively engageable with the respective end of the axle, the axle having its ends projected beyond the outer face of the wheels and formed with keyways, caps engageable over the projected ends of the axles and having flanges engaging the outer faces of the wheels, keys within the caps and engaging said keyways retaining said caps non-rotatively in position on the ends of the axle, and screws passing through apertures formed in said flanges and threaded into the outer faces of the wheels securing the caps to the wheels.

OTTO FISCHER.

REFERENCES CITED

The following references are of record in the file of this patent:

UNITED STATES PATENTS

| Number | Name | Date |
| --- | --- | --- |
| 1,614,051 | Tottereau | Jan. 11, 1927 |
| 1,759,740 | Foltz | May 20, 1930 |
| 2,052,524 | Baker | Aug. 25, 1936 |

FOREIGN PATENTS

| Number | Country | Date |
| --- | --- | --- |
| 286,256 | Germany | July 29, 1915 |